(12) United States Patent
Bradfield

(10) Patent No.: US 8,841,811 B2
(45) Date of Patent: Sep. 23, 2014

(54) CONDUCTOR INSULATION ARRANGEMENT FOR AN ELECTRIC MACHINE

(75) Inventor: Michael Bradfield, Anderson, IN (US)

(73) Assignee: Remy Technologies LLC, Pendleton, IN (US)

( * ) Notice: Subject to any disclaimer, the term of this patent is extended or adjusted under 35 U.S.C. 154(b) by 372 days.

(21) Appl. No.: 12/858,928

(22) Filed: Aug. 18, 2010

(65) Prior Publication Data

US 2012/0043110 A1 Feb. 23, 2012

(51) Int. Cl.
*H02K 3/30* (2006.01)
*H02K 3/32* (2006.01)
*H02K 3/24* (2006.01)
*H02K 3/34* (2006.01)

(52) U.S. Cl.
CPC ... *H02K 3/24* (2013.01); *H02K 3/34* (2013.01)
USPC ............................ 310/201; 310/184; 310/196

(58) Field of Classification Search
USPC .......................... 310/180, 184, 201, 196, 213
See application file for complete search history.

(56) References Cited

U.S. PATENT DOCUMENTS

| | | | | |
|---|---|---|---|---|
| 4,001,616 | A | * | 1/1977 | Lonseth et al. ................. 310/45 |
| 4,160,926 | A | * | 7/1979 | Cope et al. ..................... 310/215 |
| 5,587,619 | A | * | 12/1996 | Yumiyama et al. ........... 310/201 |
| 5,714,824 | A | * | 2/1998 | Couture et al. ................ 310/208 |
| 5,917,155 | A | * | 6/1999 | Hake et al. ................ 174/120 R |
| 6,147,430 | A | | 11/2000 | Kusase et al. |
| 6,147,432 | A | | 11/2000 | Kusase et al. |
| 6,242,836 | B1 | | 6/2001 | Ishida et al. |
| 6,333,573 | B1 | | 12/2001 | Nakamura |
| 6,335,583 | B1 | | 1/2002 | Kusase et al. |
| 6,519,993 | B2 | | 2/2003 | Even |
| 6,530,140 | B2 | * | 3/2003 | Maeda et al. ................... 29/596 |
| 6,707,211 | B2 | | 3/2004 | Oohashi et al. |
| 6,822,362 | B2 | * | 11/2004 | Ooiwa .......................... 310/179 |
| 7,038,346 | B2 | * | 5/2006 | Koike ........................... 310/184 |
| 7,622,843 | B2 | | 11/2009 | Cai |
| 7,948,142 | B2 | * | 5/2011 | Dobashi et al. ............... 310/195 |

(Continued)

FOREIGN PATENT DOCUMENTS

| | | | |
|---|---|---|---|
| EP | 356929 | * | 3/1990 |
| JP | 05-227689 | * | 9/1993 |
| JP | 09-084289 | * | 3/1997 |
| JP | 11-262209 | * | 9/1999 |

OTHER PUBLICATIONS

Machine Translation, Inoue et al., JP 9-84289, Mar. 1997.*
Machine Translation, Ogami, JP 5-227689, Sep. 1993.*

(Continued)

*Primary Examiner* — Burton Mullins
(74) *Attorney, Agent, or Firm* — Maginot, Moore & Beck LLP

(57) ABSTRACT

An electric machine includes a core with a plurality of slots. Electric conductors are positioned within the slots with connection ends extending from the in-slot portions. A plurality of insulation sleeves separate the plurality of electric conductors. Each insulation sleeve substantially covers one entire conductor, including the in-slot portions and the connection ends of the conductor. A tip portion on each connection end remains uncovered by the insulation sleeve and is electrically connected to another tip portion on another conductor. Air passages are formed between the plurality of insulation sleeves at the in-slot portions and at the connection ends of the plurality of electric conductors.

13 Claims, 5 Drawing Sheets

(56) References Cited

U.S. PATENT DOCUMENTS

| | | |
|---|---|---|
| 2002/0046875 A1 | 4/2002 | Baumann et al. |
| 2002/0056569 A1 | 5/2002 | Tsunoda et al. |
| 2008/0179984 A1* | 7/2008 | Baumann .................. 310/201 |
| 2008/0231136 A1* | 9/2008 | Obata .......................... 310/179 |

OTHER PUBLICATIONS

Machine Translation, Tsuboi, et al., JP 11-262209, Sep. 1999.*

* cited by examiner

CONDUCTOR INSULATION ARRANGEMENT FOR AN ELECTRIC MACHINE

FIELD

This application relates to the field of electric machines, and particularly to electric machine conductors.

BACKGROUND

Segmented windings are commonly used in modern electrical machine applications, such as in hybrid-electric vehicles. These windings typically comprise a plurality of segmented conductors which include in-slot portions and ends that are connected together. The conductors are positioned in the slots of a laminated core portion of the electric machine (e.g. stator slots), and the ends of the conductors are connected to form windings for the electric machine.

Segmented conductors for electric machines are often provided in the form of U-shaped conductors which include two legs and a central U-turn portion extending between the legs. These U-shaped conductors may also be referred to herein as "U-shaped bars" or conductors with "U-turn portions". The terms "U-shaped conductor", "U-shaped bar" and "U-turn portion" as used herein refer to electric conductors or conductor portions where the axial direction of the conductor changes by more than 90°, such as by about 180°. However, these terms are not limited to conductors or conductor portions that form a perfect "U" shape.

U-shaped conductors are typically created by bending and twisting wire bars into U-shaped conductors with two legs and a U-turn between the legs. The two legs are separated by a given span which allows the conductor to extend across a number of stator slots by virtue of the U-turn alone. The legs of the conductors are then inserted into the slots of the core from an insertion end of the core. Following insertion of the conductors into the slots of the core, the bend portions (i.e., the U-turn portions) are positioned on one side of the core (i.e., the "insertion side") and the leg ends extend from the other side of the core (i.e., the "connection side" or "weld side"). The legs ends may then be bent to appropriate positions, often with a first leg typically bent in one direction and another leg bent in the opposite direction such that the entire segmented extends a given slot span (e.g., 12 slots). Finally, the tips of the leg ends are connected together at the connection side of the stator to complete the windings. These connections include adjacent leg ends that are aligned directly and welded together, non-adjacent leg ends that are connected through jumper wires, and terminal connections. Together, the connected conductors form the complete winding arrangement.

Although the conductors are connected together at their ends, care must be taken to ensure that adjacent conductors do not touch each other and short-circuit the designed winding arrangement. Accordingly, electrical insulation is typically provided on the conductors to electrically insulate the conductors from one another. Segmented conductor insulation systems typically include an enamel coating that is applied and bonded directly on the bare copper wire by the wire manufacturer. Different grades of materials and temperature classes may be used for this initial layer of insulation. The electric machine manufacturer also typically applies a slot liner positioned along the walls of the slots in the lamination stack. The slot liner prevents the conductors from short-circuiting against the core.

In addition to an enamel coating on the conductors and slot liners in the core slots, some winding arrangements also include a band of insulation material on the ends of the conductor that are formed and welded together. These bands are often used in association with high voltage electric machines, such as those used with hybrid electric vehicles. In these machines, the band of insulation material often extends between adjacent layers of conductors at the insertion end or the connection end of the core. This arrangement with an additional insulation band provides extra electrical insulation protection at the U-turn portions or the connection ends of the conductors. This additional insulation protection may be significant since the welding process can sometimes thermally damage the base enamel insulation system of the wire. However, the downside to such insulation bands is that they significantly degrade the thermal performance of the end turn cooling on the weld side since the bands block the passage of cooling fluid across the surfaces of the conductor.

Accordingly, it would be advantageous to provide an insulation arrangement for electric machines with segmented conductors which provides high integrity insulation while also avoiding the thermal problem that adding insulation bands in the end turn region creates. It would be advantageous if such insulation arrangement could be provided easily and at relatively low cost to the manufacturer.

SUMMARY

In accordance with one embodiment of the disclosure, there is provided an electric machine including a core with a plurality of slots. Electric conductors are positioned within the slots. Each electric conductor includes a U-turn portion extending between two in-slot portions, with a connection end extending from each in-slot portion. A plurality of insulation sleeves separate the plurality of electric conductors. Each insulation sleeve covers substantially one entire conductor, including the U-turn portion, the in-slot portions, and the connection end of the conductor. Tip portions on the connection ends remain uncovered by the insulation sleeve. Air passages are formed between the plurality of insulation sleeves at the U-turn portions and at the connection ends of the plurality of electric conductors.

The conductors of the electric machine may include an insulation coating comprised of a resin material. The resin material provides an enamel coating that is bonded to the conductor on the U-turn portion, the in-slot portions, and the connection ends. The enamel coating does not cover the tip portion of the conductor. Each of the plurality of insulation sleeves substantially covers the enamel coating on one of the conductors. Each insulation sleeve may be friction-fit to the associated electric conductor to maintain the position of the sleeve on the conductor.

In at least one embodiment, each of the plurality of insulation sleeves is configured as an elongated sheet of insulation material that spiral wraps around one of the plurality of electric conductors. In another embodiment, each of the plurality of insulation sleeves is configured as a continuous tube member, such as an extrusion tube or a shrink-wrap tube. The U-turn portion and the in-slot portions of each electric conductor are positioned in one of the tubes.

The above described features and advantages, as well as others, will become more readily apparent to those of ordinary skill in the art by reference to the following detailed description and accompanying drawings. While it would be desirable to provide a conductor insulation system for an electric machine that provides one or more of these or other advantageous features, the teachings disclosed herein extend to those embodiments which fall within the scope of the

DESCRIPTION

Figure 1:
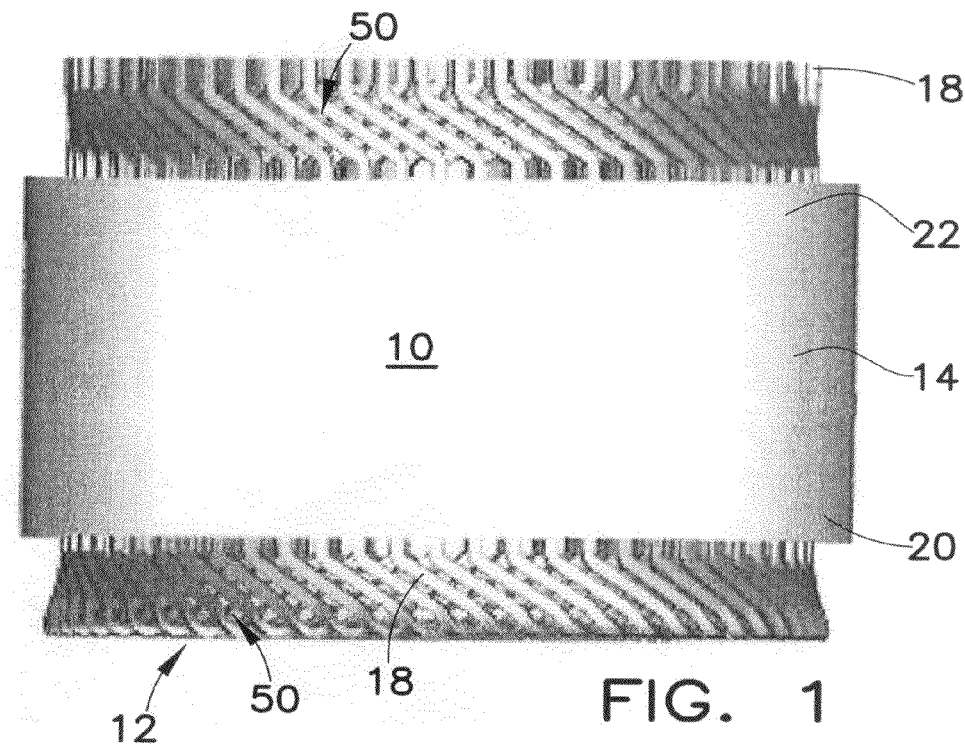
FIG. 1 shows a side view of an embodiment of a core of an electric machine with a winding positioned on the core having a conductor insulation arrangement.

With reference to FIG. 1, an exemplary electric machine core 10 is shown with a winding arrangement 12 positioned on the core. The core 10 in the embodiment of FIG. 1 is a stator that is magnetically coupled to a rotor (not shown) through the winding arrangement 12. Although the core 10 is represented as a stator in the embodiment of FIG. 1, it will be recognized that in other embodiments, the winding arrangement 12 may be provided on the rotor. The stator 10 includes a main body portion 14 with a plurality of slots 16 (see FIG. 2) formed therein. A plurality of segmented conductors 18 are placed in slots of the stator 10 to form the armature winding arrangement 12. The segmented conductors 18 define an insertion side 20 (which may also be referred to herein as the "insertion end") of the stator 10, and the conductors 18 are inserted into the slots 16 from the insertion side 20. Opposite the insertion side of the stator is a weld side 22 (which may also referred to herein as the "weld end") of the stator 10.

Figure 2:
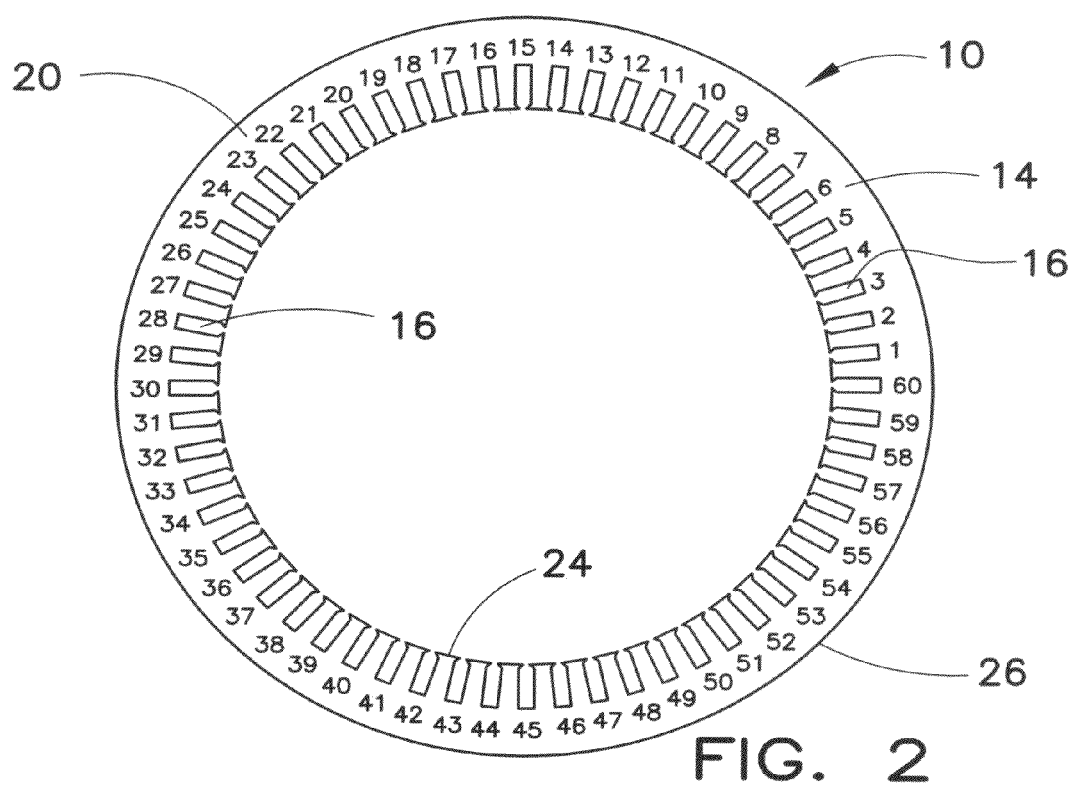
FIG. 2 shows a diagrammatic top view of the core of FIG. 1.

FIG. 2 shows a top view of the insertion side 20 of the exemplary electric machine core 10 of FIG. 1 without the armature windings 18 placed in the stator slots 16. As shown in FIG. 2, the stator is generally disc shaped with an inner circumferential perimeter 24 and an outer circumferential perimeter 26. The exemplary stator 10 of FIG. 2 includes sixty slots 16. In other embodiments, the stator 10 may include more slots or fewer slots. Openings to the stator slots 16 are provided through the inner perimeter 24 as well as the insertion side 20 and weld side 22 of the stator.

Figure 3:
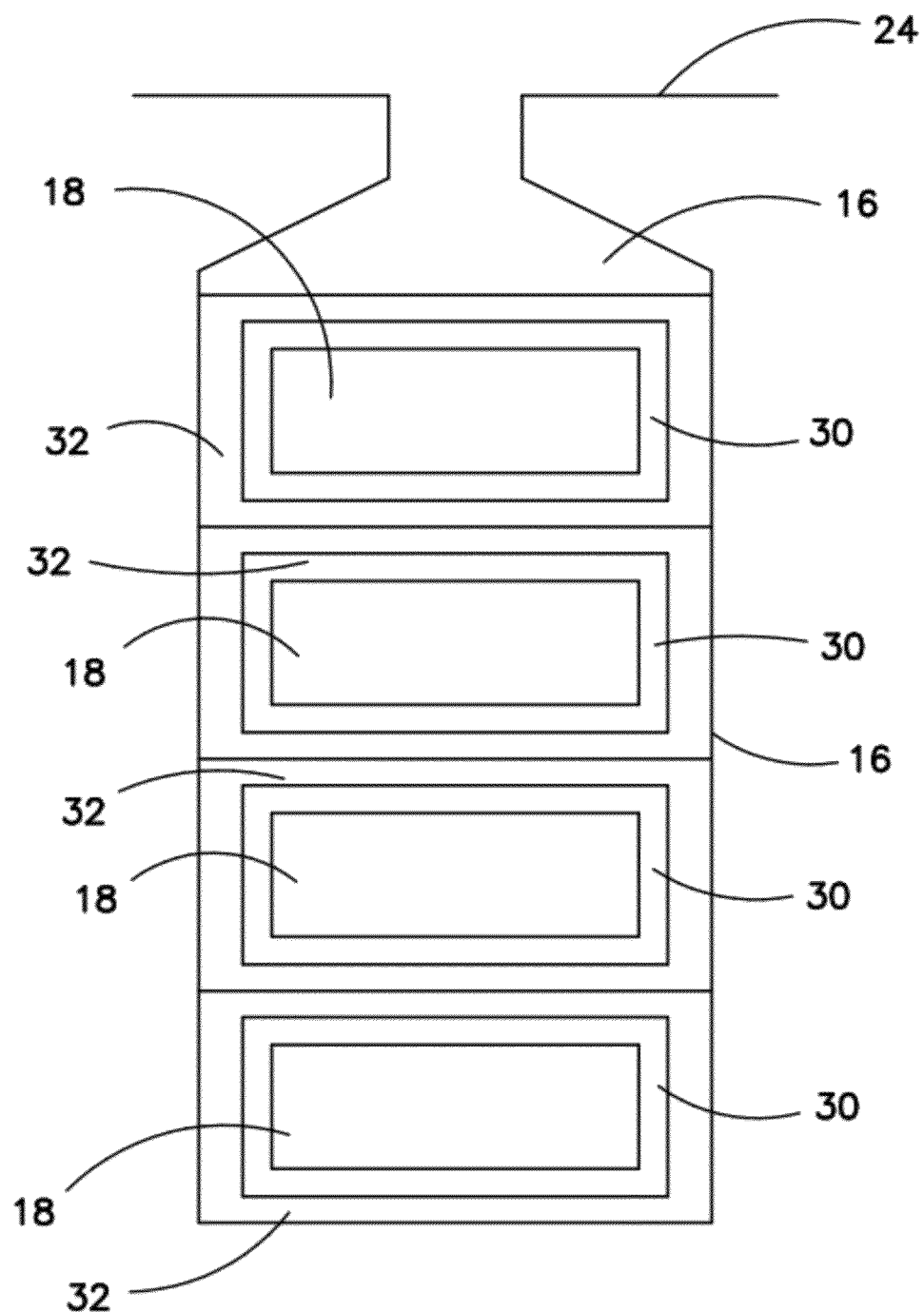
FIG. 3 shows a diagrammatic cross-sectional view of a slot in the core of FIG. 1.

FIG. 3 shows an enlarged cross-sectional view of one of the slots 16 of the stator 10 with the segmented conductors 18 placed in the stator. In the exemplary embodiment of FIG. 3, the segmented conductors 18 have a rectangular cross-section and four conductors 18 are placed in each slot 16. In other embodiments, the conductors 18 may have a different shape and more or less conductors may be placed in each slot 16. Each conductor 18 is separated from neighboring conductors in the slot 16 by insulation layers 30, 32, as described in further detail below.

Figure 4:
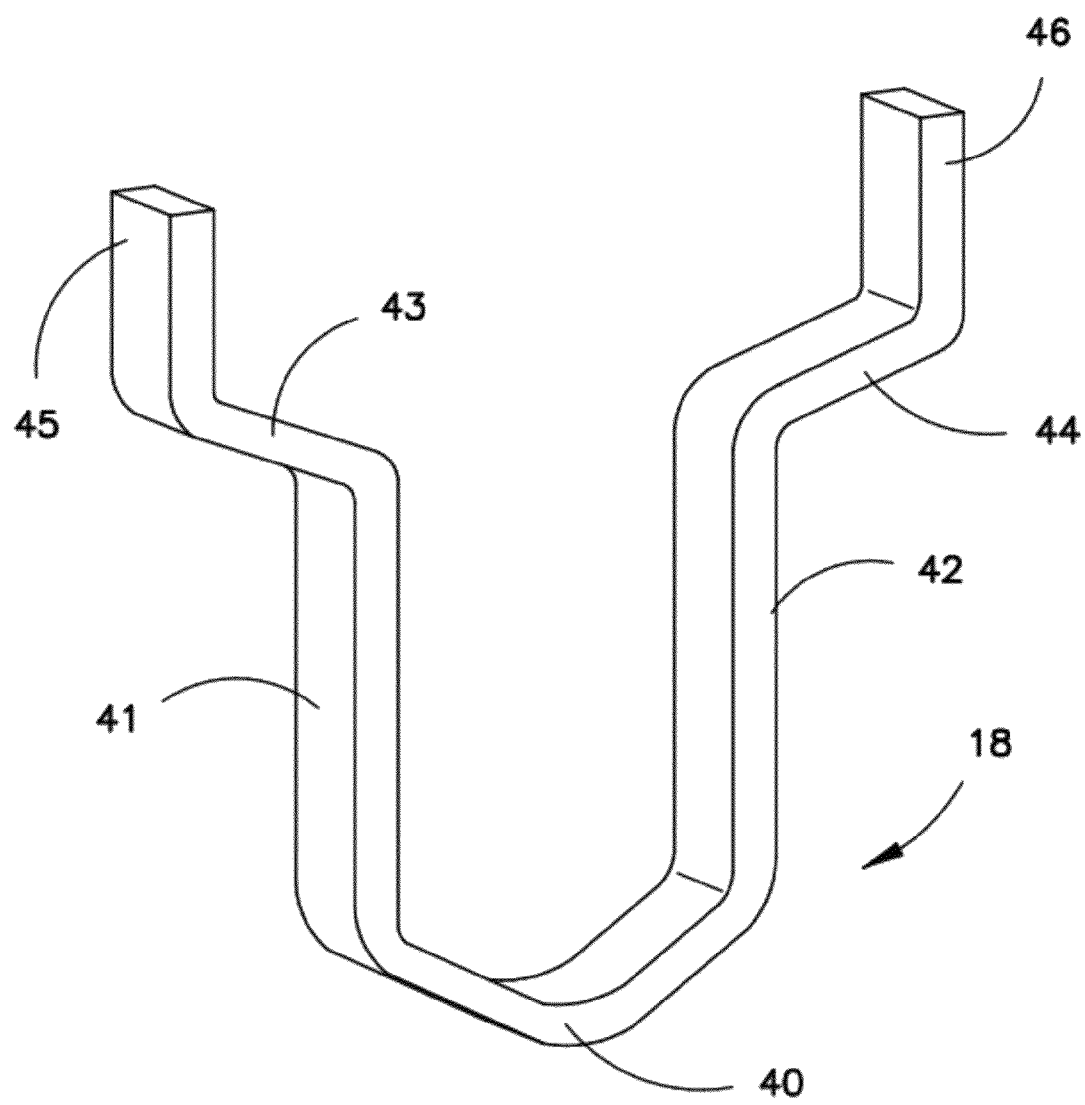
FIG. 4 shows a perspective view of a segmented conductor for the electric machine winding of FIG. 1.

An exemplary U-shaped segmented conductor 18 of rectangular cross-section is shown in FIG. 4. The segmented conductor 18 includes two in-slot portions 41 and 42 connected by a U-turn portion 40. Each in slot portion 41, 42 is joined to an associated connection end 43, 44. Tips 45, 46 are provided on each connection end 43, 44. Each tip 45, 46 is connected to the tip of another conductor such that the conductors together form the winding arrangement 12 on the stator 10. An exemplary winding arrangement is shown in U.S. Pat. No. 7,622,843, issued Nov. 24, 2009, the contents of which are incorporated herein by reference.

The segmented conductors 18 are generally formed from a straight conductor segment that is bent to the shape shown in FIG. 4. In particular, before the conductor 18 is inserted into the stator, a machine bends the conductor segment to create the U-turn portion 40 with the in-slot portions positioned in parallel at opposite sides of the U-turn portion. At this time, the connection ends 43, 44 extend straight out from the in-slot portions 41, 42 (see, FIG. 5). After the U-turn portion 40 is created, and the insulation layers 30, 32 are placed on the conductor 18, the conductor 18 is inserted into the stator 10. The connection ends 43, 44 are first inserted into the slots from the insertion side 20 of the stator, with the in-slot portions 41, 42 following the connection ends 43, 44. Once placed in the stator 10, the in-slot portions 41, 42 of a given conductor 18 are positioned in different slots 16 of the stator. The connection ends 43, 44 extend from the weld side 24 of the stator, opposite the U-turn portions 40. After being inserted in the stator, the connection ends 43, 44 are bent by a machine in opposite directions by a predetermined distance. Thereafter, the tip 45, 46 of each connection end is directly connected to an adjacent tip on another conductor 18. The connection of the tips 45, 46 may be made in any number of ways such as welding, brazing, or other methods known in the art. By connecting the segmented conductors in this fashion, complete windings 12 are formed on the stator 10.

Figure 5:
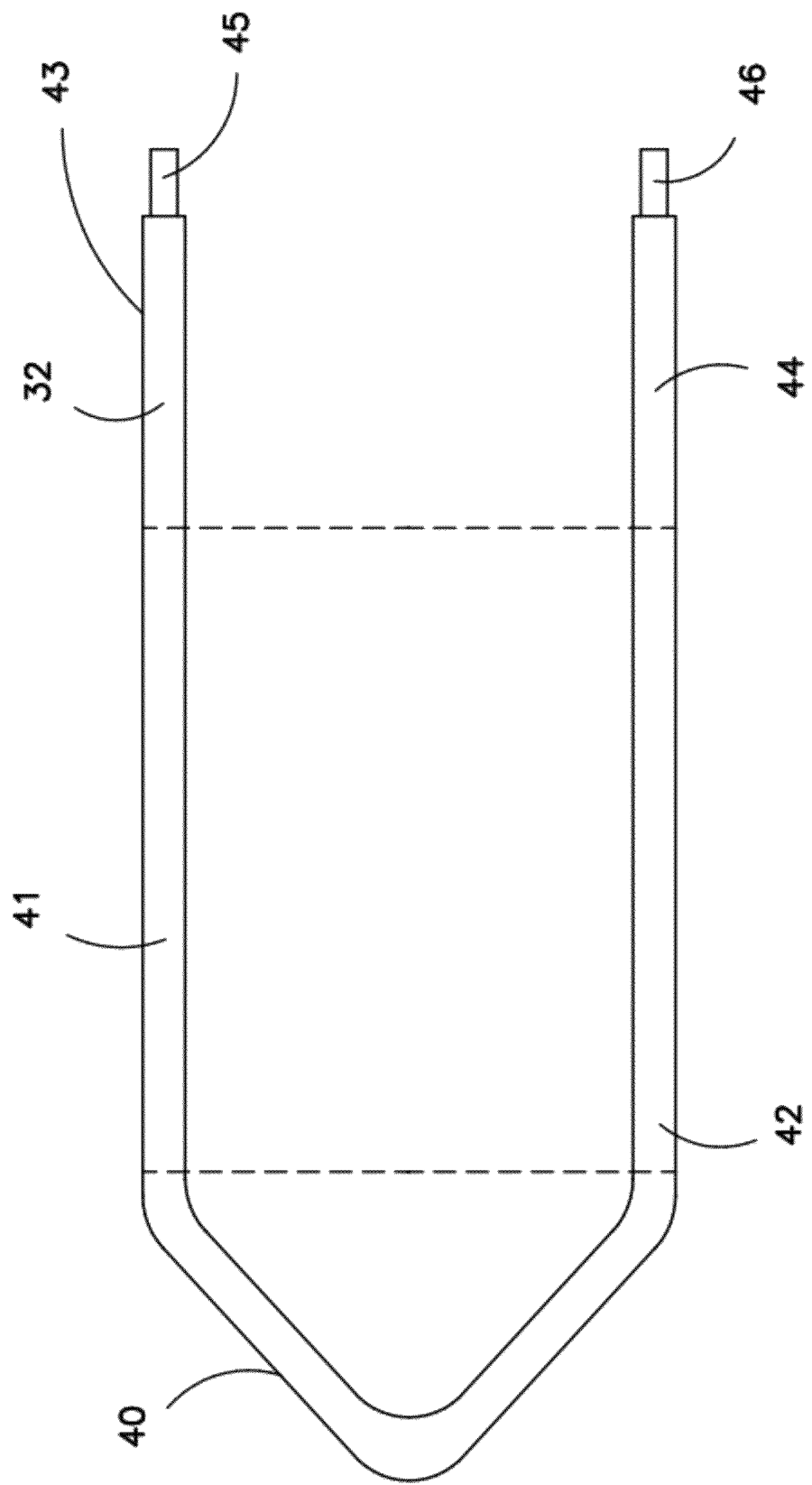
FIG. 5 shows a side view of a segmented conductor for the electric machine winding of FIG. 1 with the conductor insulation arrangement provided on the conductor.

With particular reference now to FIG. 5, a conductor 18 is shown before it is inserted into the slots of the stator 10. A first layer 30 and a second layer 32 of insulation are provided on substantially the entire length of the conductor 18, including the U-turn portion 40, the in-slot portions 41, 42, and the connection ends 43, 44. However, the tips 45, 46 of the conductor 18 remain free of electrical insulation so that the conductors may be connected together at the tips 45, 46. The first and second layers of insulation 30, 32 may be added to the conductor either before or after the U-turn portion 40 is created.

The first layer of insulation 30 is a thin layer of resin material that is bonded to the surface of the conductor by any of various methods known in the art. The resin material provides an enamel coating that extends along the entire conductor 18, from one connection end 43, along the in-slot portions 41, 42 and U-turn portion 40, and to another connection end 44. The enamel coating 30 does not cover the tips 45, 46 of the conductor 18.

Figure 6:
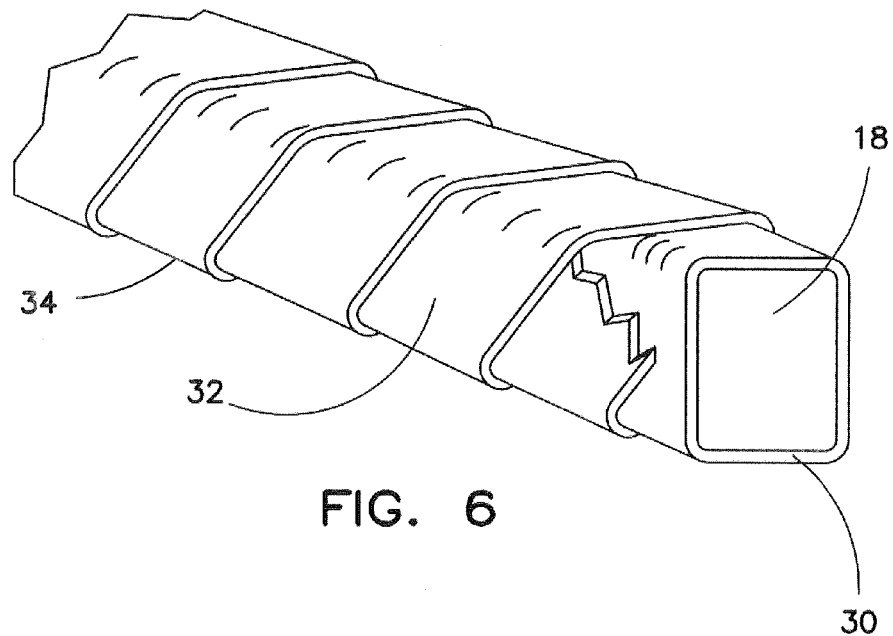
FIG. 6 shows a partial perspective view of a segmented conductor with one embodiment of the conductor insulation arrangement of FIG. 1.

The second insulation layer 32 is provided as a sleeve of insulation material that covers the first insulation layer 30 and the associated conductor 18, but does not cover the tips 45, 46. The material for the second insulation layer 32 may be comprised of, for example, polyimide, polyamide, polyester, polyamideimide, stretched polyethylene terephthalate film, or other insulation materials. The insulation sleeve 32 may be provided on the first insulation layer 30 in different ways. For example, as shown in FIG. 6, the insulation sleeve 32 may be provided as an elongated sheet 34 of insulation material that spiral wraps around the electric conductor 18 and the first layer of insulation 30. In this embodiment, opposite sides of the elongated sheet 34 may overlap as the insulation material twists around the conductor 18.

Figure 7:
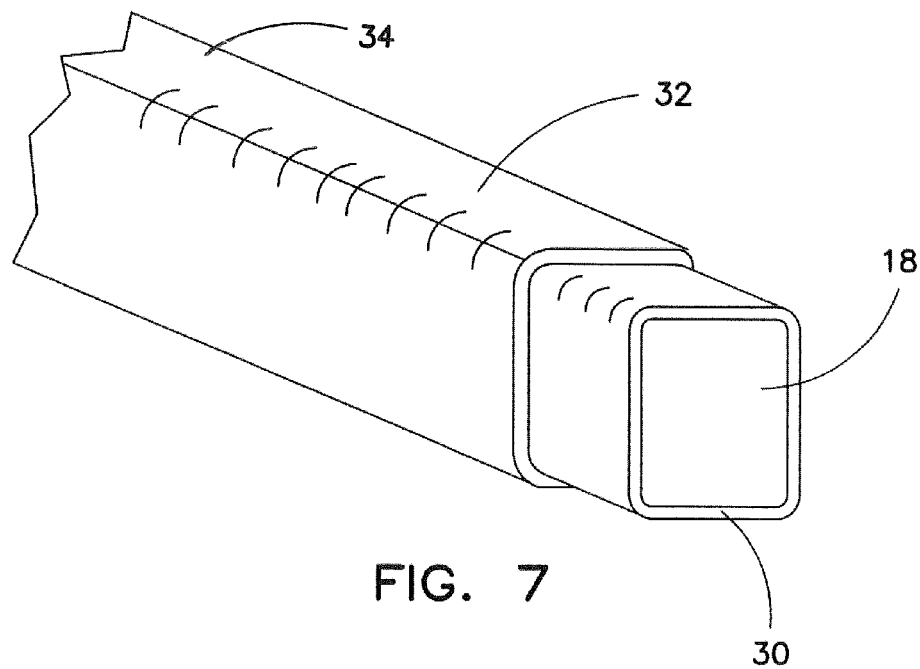
FIG. 7 shows a partial perspective view of a segmented conductor with another embodiment of the conductor insulation arrangement of FIG. 1.

Another exemplary embodiment of the insulation sleeve 32 is shown in FIG. 7. In this embodiment, the insulation sleeve 32 may be provided as a continuous tube member 36 that is positioned over the conductor 18 and first insulation layer 30 and extends substantially the entire length of the conductor 18. In one embodiment, the continuous tube member may be provided as an extrusion tube and the conductor 18 may be slid into the tube before it is bent. In another embodiment, the continuous tube member may be provided as a shrink-wrap tube where the conductor is slid into the tube, bent to the desired shape, and heated such that the shrink wrap material is provided in close contact with the enamel coating 30 on the conductor 18.

The sleeve 32 may be formed around the conductor 18 and first insulation layer 30, or alternatively, the sleeve 32 may be pre-formed such that the conductor 18 is positioned in the sleeve 32 after the sleeve is formed. For example, in the embodiment of FIG. 6, the sheet 34 may include an adhesive on one side that bonds the sheet 34 to the first insulation layer 30 as the sheet is wrapped around the conductor 18. Alternatively, the sheet 34 may be pre-formed to a slightly larger dimension than the conductor and first insulation layer, thus allowing the conductor and first insulation layer to slide into the sleeve 32. In various embodiments the sleeve 32 may be bonded to the conductor 18 or may be friction-fit on electric conductor. As used herein, the term "friction fit" means that the sleeve 32 is held in place on the conductor 18 as a result of its shape or close contact with the conductor, but is not bonded to the conductor.

With reference again to FIG. 5, it can be seen that the insulation sleeve 32 extends substantially the entire length of the conductor 18, and is not limited to the in-slot portions 41, 42 (i.e., the portion between the dotted lines in FIG. 5). Accordingly, the sleeve 32 provides a second layer of insulation (in addition to the first enamel layer 30) along substantially the entire length of the conductor. As a result, four layers of insulation are provided between any two adjacent conductors 18 in the winding. These four layers of insulation between adjacent conductors 18 can be clearly seen in FIG. 3 (i.e., two layers from the enamel coating 30 and two layers from the insulation sleeve 32). However, because the first and second insulation layers 30, 32 extend substantially the entire length of the conductors 18, the four layers of insulation between adjacent conductors are not limited to the in-slot portions shown in FIG. 3, but further extend to the end-turn regions of the windings. Accordingly, four layers of insulation also exist between adjacent conductors in the U-turn portions 40 (i.e., on the insertion side 20 of the stator 10) and between adjacent conductors on the connection ends 43, 44 (i.e., on the connection side 22 of the stator 10).

With the embodiments disclosed herein, even though additional insulation is added to each conductor by layers 30 and 32, the thickness of each insulation layer is very small, e.g., a few thousands of an inch (it will be noted that FIG. 3 is not drawn to scale). Accordingly, the dual insulation layers 30, 32 associated with each conductor 18 actually allows the electric machine to be produced with greater cooling efficiency. In particular, because the insulation layers 30, 32 are relatively thin and closely adhere to the conductors, air passages 50 exist between each of the conductors 18 on the insertion side 22 of the stator 10 and the connection side 22 of the stator. These air passages allow for cooling fluid to flow between the conductors without the need for any thick annular insulation bands that block the air passages, as have been used in the past. This provides a significant thermal benefit to the electric machine.

The foregoing detailed description of one or more embodiments of the conductor insulation arrangement has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An electric machine comprising:
   a stator core with a plurality of slots;
   a plurality of electric conductors positioned in the slots and connected together to form a winding that extends substantially around the core, each of the plurality of electric conductors including a U-turn portion extending between two in-slot portions and connection ends extending from the in-slot portions, the connection ends extending from an opposite end of the core from the U-turn portions, each connection end including a tip connected to a tip of another connection end such that the plurality of connected electric conductors provide a conductive path extending substantially around the core;
   a resin insulation coating bonded to the U-turn portion, the in-slot portions, and the connection ends of the plurality of electric conductors; and
   a plurality of insulation sleeves separating the plurality of electric conductors, the plurality of insulation sleeves substantially covering the resin insulation coating on the U-turn portion, the in-slot portions, and the connection ends of each of the plurality of electric conductors, but not covering the tips on the connection ends of the plurality of electric conductors, each of the plurality of insulation sleeves is friction-fit to one of the plurality of electric conductors.

2. The electric machine of claim 1 wherein each of the plurality of insulation sleeves is configured as an elongated sheet of insulation material that spiral wraps around one of the plurality of electric conductors.

3. The electric machine of claim 1 wherein the plurality of insulation sleeves are comprised of polyimide, polyamide, polyester, polyamideimide, or stretched polyethylene terephthalate film.

4. The electric machine of claim 1 wherein each of the plurality of insulation sleeves provides an outer insulation layer on the one of the plurality of conductors.

5. An electric machine comprising:
   a stator core with a plurality of slots;
   a plurality of electric conductors positioned in the slots and connected together to form a winding that extends substantially around the core, each of the plurality of electric conductors including a U-turn portion extending between two in-slot portions and connection ends extending from the in-slot portions, the connection ends extending from an opposite end of the core from the U-turn portions, each connection end including a tip connected to a tip of another connection end such that the plurality of connected electric conductors provide a conductive path extending substantially around the core;

a resin insulation coating bonded to the U-turn portion, the in-slot portions, and the connection ends of the plurality of electric conductors; and a plurality of insulation sleeves separating the plurality of electric conductors, the plurality of insulation sleeves substantially covering the resin insulation coating on the U-turn portion, the in-slot portions, and the connection ends of each of the plurality of electric conductors, but not covering the tips on the connection ends of the plurality of electric conductors, wherein each of the plurality of insulation sleeves is configured as a continuous tube member with the U-turn portion and the in-slot portions of one of the plurality of electric conductors positioned within the tube, and wherein air passages are positioned between any two of the plurality of insulation sleeves along the U-turn portions and the connection ends of the plurality of electric conductors.

6. The electric machine of claim 5 wherein the continuous tube member is an extrusion tube.

7. The electric machine of claim 5 wherein the continuous tube member is a shrink-wrap tube.

8. The electric machine of claim 5 wherein the plurality of insulation sleeves are friction-fit on the plurality of electric conductors.

9. An electric machine comprising:

a stator core with a plurality of slots, the stator core defining a first axial end and a second axial end;

a plurality of conductors positioned in the slots and connected together to form a winding that extends substantially around the stator core, each of the plurality of conductors comprising two in-slot portions positioned within the plurality of slots, a U-turn portion extending between the two in-slot portions on the first axial end of the core, and two connection ends extending from the two in-slot portions on the second axial end of the core with a tip portion provided at the end of each connection end, each of the plurality of conductors connected to another of the plurality of conductors at the tip portion, each of the plurality of electric conductors including a resin insulation coating bonded to the U-turn portion and the in-slot portions; and a plurality of insulation sleeves friction fit on the plurality of conductors, each of the plurality of insulation sleeves substantially covering an entire length of one of the plurality of conductors without covering the tip portion, with a plurality of air passages positioned between the insulation sleeves at the U-turn portions and the connection ends of the conductors.

10. The electric machine of claim 9 wherein each of the plurality of insulation sleeves covers the resin insulation coating on the U-turn portion and the in-slot portions.

11. An electric machine comprising:

a core with a plurality of slots, the core defining a first axial end and a second axial end;

a plurality of conductors positioned in the slots and connected together to form a winding that extends substantially around the core, the plurality of conductors including first portions extending from the first axial end of the core, second portions in the plurality of slots of the core, and third portions extending from the second axial end of the core, the third portions comprising U-turn portions, each first portion connected to another first portion on the first axial end of the core such that the plurality of conductors are connected to provide a conductive path extending substantially around the core;

a plurality of first insulation layers, each first insulation layer bonded to each of the plurality of conductors at the first, second and third portions of the conductor;

a plurality of second insulation layers covering the first insulation layer including the U-turn portions on each of the plurality of conductors, wherein the plurality of second insulation layers comprise a plurality of insulation sleeves provided on the plurality of conductors, each of the plurality of insulation sleeves configured as a continuous tube member and substantially covering an entire length of one of the plurality of conductors including the second portion and the third portion of the conductor without covering a tip portion of the conductor; and a plurality of air passages formed between the plurality of second insulation layers at both the first portions and the third portions of the conductors.

12. The electric machine of claim 11 wherein the plurality of first insulation layers are comprised of a resin material bonded to the conductor, and wherein the plurality of second insulation layers are comprised of polyimide, polyamide, polyester, polyamideimide, or stretched polyethylene terephthalate film.

13. The electric machine of claim 11 wherein each of the plurality of second insulation layers provides an outer insulation layer on the one of the plurality of conductors.

\* \* \* \* \*